United States Patent [19]
Green et al.

[11] 3,923,973

[45] *Dec. 2, 1975

[54] FUNGICIDAL POLYMERIC QUATERNARY AMMONIUM COMPOUNDS

[75] Inventors: Harold A. Green, Havertown, Pa.; John J. Merianos, Jersey City; Alfonso N. Petrocci, Glen Rock, both of N.J.

[73] Assignee: Millmaster Onyx Corporation, New York, N.Y.

[ * ] Notice: The portion of the term of this patent subsequent to Apr. 1, 1992, has been disclaimed.

[22] Filed: Sept. 30, 1974

[21] Appl. No.: 510,617

Related U.S. Application Data

[63] Continuation-in-part of Ser. No. 425,931, Dec. 18, 1973, Pat. No. 3,874,870.

[52] U.S. Cl. .................. 424/78; 424/325; 424/329
[51] Int. Cl.$^2$. A61K 31/74; A01N 9/20; A01N 9/24
[58] Field of Search....................... 424/329, 78, 325

[56] References Cited
UNITED STATES PATENTS

| | | | |
|---|---|---|---|
| 3,140,976 | 7/1964 | Berenschot et al. | 424/329 |
| 3,539,684 | 11/1970 | Hoover | 424/78 |
| 3,771,989 | 11/1973 | Pera et al. | 424/329 |
| 3,778,283 | 12/1973 | Frezhold | 106/84 |

FOREIGN PATENTS OR APPLICATIONS 69-8949  7/1970  South Africa

OTHER PUBLICATIONS

Hackh's Chem. Dictionary—Grant—The Blakiston Co. — Philadelphia, Pa. p. 360, 1944.

*Primary Examiner*—Sam Rosen
*Assistant Examiner*—D. W. Robinson
*Attorney, Agent, or Firm*—Arthur A. Jacobs, Esq.

[57] ABSTRACT

The use of polymeric quaternary ammonium compounds prepared by the condensation of 1,4-dihalo-2-butene and 1,4-bis-(dimethylamino)-2-butene as microbiocidal agents in aqueous systems.

5 Claims, No Drawings

FUNGICIDAL POLYMERIC QUATERNARY AMMONIUM COMPOUNDS

This is a continuation-in-part of co-pending application Ser. No. 425,931, filed Dec. 18, 1973 now U.S. Pat. No. 3,874,870.

This invention relates to microbiocidal agents, and it particularly relates to microbiocidal agents comprising polymeric quaternary ammonium compounds.

It is known that many quaternary ammonium compounds have biocidal or inhibitory effects on microorganisms. However, few such compounds, or indeed few biocidal compounds of any type, have been found to have all the necessary characteristics required for the biocidal treatment of aqueous systems of the recirculated type such as industrial or process waters of the type used in paper manufacturing, cooling towers, air conditioners, humidifiers and the like. Even relatively standing waters such as swimming pools have been problems insofar as maintaining them substantially free of bacteria, fungi and algae.

The control of microorganisms in aqueous systems of the aforesaid type has long been recognized as a particularly burdensome problem since the environment of the aqueous medium itself is often extremely conducive to rapid multiplication and growth of these undesirable organisms. Only through the rise of carefully tailored microbiocidal agents can this growth and reproduction be reliably controlled without detriment of the process in which the water is used. For example, many times a biocidal compound is rendered completely inactive by the particular surrounding media containing the undesirable microorganisms. A particular problem in recirculated waters is that the recirculation causes many difficult problems, among which is the gradual buildup and accumulation of undesirable microorganisms in the aqueous fluid. Various bacteria, fungi and algae are favorably produced in such recirculated waters.

Another common feature of quaternary ammonium biocides is that their biocidal effectiveness is diminished in the presence of non-ionic emulsifiers, often to the point where they no longer function as acceptable biocides. This has significantly reduced their possible use in cosmetics and similar preparations that require the inclusion of non-ionic emulsifiers.

An additional problem in the use of most microbiocidal agents in aqueous systems is the formation of large amounts of foam. This foam is generally highly undesirable and the formation thereof by these agents often makes them useless for particular applications.

In accordance with the present invention, it has now been discovered that certain polymeric quaternary ammonium compounds and, particularly, the product made by the condensation of 1,4-dihalo-2-butene and 1,4-bis-(dimethylamino)-2-butene is not only a highly effective microbiocidal agent in aqueous systems, including recirculating waters, industrial waters, cosmetics and other emulsions containing non-ionic emulsifiers, as well as in general usage, but also effects such purpose without causing undue foaming.

It is to be noted that a particular aspect of the present invention is that the quaternary ammonium moieties of the present compounds are part of a long chain rather than being on branches that are bonded to the long chain.

The aforesaid compounds are active against *Pseudomonas aeruginosa* at a concentration relative to the total composition as low as 25 ppm, although the preferred concentration is about 150 ppm. Against *Aerobacter aerogenes*, they are active at a concentration as low as 10 ppm, although the preferred concentration is about 100 ppm. Against fungi, such as *Penicilium expansum*, they are active at a concentration at least as low as 100 ppm. Against algae, such a *Chlorella pyrenoidosa*, they are active at a concentration at least as low as 1 ppm and probably even much below that concentration according to present indications.

Insofar as concerns upper limits, the concentration may apparently be increased indefinitely without deleteriously affecting the biocidal activity.

More specifically with regard to cosmetic compositions, the products of this invention are effective at a concentration at least as low as about 500 ppm relative to the total composition, and probably at even lower concentrations, according to present indications. The preferred range, however, is about 1,000 to 2,000 ppm.

There is no absolute certainty of the actual structure of the product of the condensation reaction because isomerizations are possible. However, ideally, the reaction would appear to be as follows:

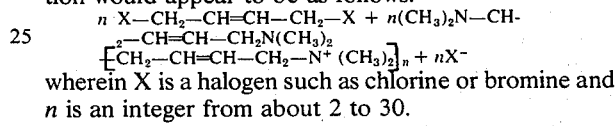

wherein X is a halogen such as chlorine or bromine and $n$ is an integer from about 2 to 30.

The following examples illustrate the present invention with no intent to be limited thereby, however, except as claimed:

EXAMPLE 1

14.2 grams of 1,4-bis-(dimethylamino)-2-butene (0.1 mole) was dissolved in 25 grams of water, and to it was added 12.5 grams (0.1 mole) of 1,4-dichloro-2-butene over a period of 15 to 30 minutes while maintaining constant stirring. The reaction was exothermic so that the temperature rose to about 60°–70°C. The reaction mixture was then warmed on a steam bath at a temperature of about 80°C. for about 1 hour, after which the reaction was considered complete. Titration of ionized chlorine was used as a measure of the extent of the reaction and indicated between 98 to 100% completeness. The reaction product was a viscous material containing about 50% active material.

It was found that when a significant excess of the dichlorobutene was used, a second phase separated out of the final reaction product. Analysis indicated this second phase to contain primarily unreacted dichlorobutene.

Quite surprisingly, the compounds of this invention may be obtained directly as crystalline-like solids when the reaction is carried out in certain organic solvents such as isopropanol, acetone and inert halogenated solvents. This is illustrated as follows:

EXAMPLE 2

14.2 grams of 1,4-bis-(dimethylamino)-2-butene were mixed with 25 grams of isopropanol, and to it was added, with stirring, 12.5 grams of 1,4-dichloro-2-butene over a period of about 15 minutes (or at a rate which keeps the solvent gently refluxing). After the exothermic reaction subsided, the mixture was warmed on a steam bath of reflux temperature and maintained at such temperature for about 1 hour. It was then cooled, to room temperature, whereby a precipitate was formed. The precipitate was then separated out by filtration as the final product. The precipitate weighed 18.7 grams. This product is substantially free from impurities caused by side reactions or due to absorption of unreacted starting materials, thereby making it easier to purify for use in cosmetics or cosmetic emulsions.

Solid products of the above type have the commercial advantage over aqueous solutions or dispersions because they have less bulk on a pound for pound active ingredient basis.

EXAMPLE 3

The same reactants and procedures were used as in Example 2 except that instead of the isopropanol, 25 grams of acetone was used. It yielded 21.4 grams of a solid product.

The same procedures may be used except that 1,4-dibromo-2-butene is substituted for the 1,4-dichloro-2-butene, with equivalent mol ratios. The product is substantially similar in all essential characteristics.

EXAMPLE 4

142 grams of 1,4-bis-(dimethylamino)-2-butene were dissolved in 300 ml. of 1,1,1-trichloroethane and to it was added slowly, with constant stirring, 125 grams of 1,4-dichloro-2-butene at a tate which kept the reaction mixture at a temperature between 45° and 60°C, and stirring was continued at 45° to 60°C. for 1 hour after an almost-white precipitate was first deposited. After cooling, the precipitate was collected by filtration and dried in a vacuum desiccator. It weighed 245 grams.

Various changes in relative proportions were made to determine whether any significant variations occurred. These are illustrated as follows:

EXAMPLE 5

14.2 grams of 1,4-bis-(dimethylamino)-2-butene (0.1 mole) was dissolved in 35 grams of water, and to it was added 25.0 grams of 1,4-dichloro-2-butene (0.2 moles) over a period of 15–30 minutes, maintaining constant stirring. The reaction was exothermic. After one hour analysis for ionic chloride showed that the reaction was about 98% complete.

EXAMPLE 6

The same reactants and procedures were used as in Example 5, but the solvent was 35 grams of isopropyl alcohol instead of water. After about 1 hour, the solid polymeric product was filtered off. It weighed about 18.7 grams.

EXAMPLE 7

The same reactants and procedures as used in Example 5, but using 35 grams of acetone as a solvent instead of water, gave a solid product which weighed 21.4 grams after filtration.

EXAMPLE 8

14.2 grams of 1,4-bis-(dimethylamino)-2-butene (0.1 mole) was dissolved in 45 grams of water, and to it was added 37.5 grams of 1,4-dichloro-2-butene over a period of 15–30 minutes, maintaining constant stirring. The reaction was exothermic. After 1 hour, analysis for ionic chloride showed that the reaction was about 98% complete.

EXAMPLE 9

The same reactants and procedures as used in Example 8 were used with 45 grams of isopropyl alcohol instead of water. After about one hour, the solid polymeric product was filtered off. It weighed about 18.7 grams.

EXAMPLE 10

The same reactants and procedures as used in Example 8, but using 45 grams of acetone instead of water gave a solid product which weighed 21.4 grams after filtration.

EXAMPLE 11

14.2 grams of bis-(dimethylamino)-2-butene (0.1 mole) was dissolved in 20 grams of water and to it was added 6.3 grams of 1,4-dichloro-2-butene (0.05 mole) over a period of 15–30 minutes. The reaction was exothermic. After 1 hour, analysis for ionic chloride showed that the reaction was about 98% complete.

EXAMPLE 12

The same reactants and procedures used in Example 11 were used with 20 grams of isopropyl alcohol as solvent instead of water. After about 1 hour, the solid polymeric product was filtered off. It weighed 9.4 grams.

EXAMPLE 13

The same reactants and procedures as used in Example 11 were used, except that 20 grams of acetone replaced water as solvent. After about 1 hour, the product weighed about 10.7 grams.

EXAMPLE 14

21.3 grams of 1,4-bis-(dimethylamino)-2-butene was (0.15 moles) dissolved in 25 grams of water, and to it was added 6.3 grams of 1,4-dichloro-2-butene (0.05 moles) over a period of 15–30 minutes, maintaining constant stirring. After 1 hour, analysis for ionic chloride showed about 98% completion.

EXAMPLE 15

The same reactants used in Example 14, but with 25 grams of isopropyl alcohol replacing water as solvent, produced 9.4 grams of solid polymeric product after filtration.

EXAMPLE 16

The same reactants used in Example 14, but with 25 grams of acetone replacing water as solvent, produced about 10.7 grams of solid polymeric product.

EXAMPLE 17

In order to determine the microbiocidal effectiveness of the present compound, the following test procedures were used:

Bactericidal Tests 1. 50 ml. volume of the product of Example 1 (hereinafter referred to as "Product A") was diluted in distilled water to the test concentration, and was added asceptically to previously sterilized cotton-stoppered 125 ml. Erlenmeyer flasks. For comparative purposes, the same test concentration was prepared using another known microbiocidal polymeric quaternary ammonium compound, namely a product produced by the reaction of bis(2-chloroethyl) ether and tetramethyl ethylenediamine (hereinafter referred to as ("Product B").

2. One set of test flasks were each inoculated with 0.5 ml. of a 1/10 nutrient broth dilution of a 24-hour nutrient broth culture of Aerobacter aerogenes and another set of test flasks were each inoculated with 0.5 ml. of a 1/10 nutrient broth dilution of a 24-hour nutrient broth culture of Pseudomonas aeruginosa.

3. At 30 and 60, minutes following inoculation, a 1 ml. aliquot of each product was removed from each flask and added to 9 ml. of sterile azolectin/"Tween 80" neutralizer from which additional ten fold serial dilutions were prepared in the sterile neutralizer solution.

4. Agar plate counts were prepared from $10^{-2}$ and $10^{-3}$ dilutions.

5. A control of sterile distilled water was similarly inoculated and aliquots were made at the same intervals and plates at $10^{-4}$, $10^{-5}$, and $10^{-6}$ dilutions.

6. A comparison of the surviving organisms for various concentrations of the test materials, at the different time periods was made. The results were as follows:

Table 1

AGAINST PSEUDOMONAS AEROGINOSA

| Sample | Conc. in ppm | No. of Bacteria Surviving After 30 min. | 60 min. |
|---|---|---|---|
| "Product A" | 75 | 29,600 | 18,500 |
| | 100 | 18,000 | 6,800 |
| "Product B" | 150 | 26,000 | 6,800 |
| | 200 | 19,900 | 4,000 |
| | 250 | 12,200 | 200 |
| Untreated (Control) | | 8,500,000 | 12,500,000 |

Table 2

AGAINST AEROBACTER AEROGENES

| Sample | Conc. in ppm | No. of Bacteria Surviving After 30 min. | 60 min |
|---|---|---|---|
| "Product A" | 20 | 5,600 | 4,300 |
| | 50 | 3,000 | 1,000 |
| | 100 | 1,200 | <100 |
| "Product B" | 100 | 30,000 | 30,000 |
| | 200 | 5,700 | 700 |
| | 300 | 700 | <100 |
| Untreated (Control) | | 10,500,000 | 11,000,000 |

Table 3

The following Table comprises a comparison of "Product A" and "Product B" at identical concentrations:

AGAINST AEROBACTER AEROGENES

| Sample | Conc. in ppm | No. of Bacteria Surviving After 30 min. | 60 min. | 180 min. |
|---|---|---|---|---|
| "Product A" | 20 | 5,900 | 1,400 | <100 |
| | 50 | 3,300 | 450 | <100 |
| | 100 | 1,250 | 350 | <100 |
| "Product B" | 20 | >300,000 | >300,000 | 94,000 |
| | 50 | >300,000 | 166,000 | 28,100 |
| | 100 | >300,000 | 87,500 | 14,350 |

Algaestatic Tests 1. 24 ml. volumes of Product A and Product B were prepared in sterile Erlenmeyer flasks at various test concentrations.

2. 1 ml of 5–7 days "Allen's liquid medium" growth of Chlorella pyrenoidosa (Wisc. strain) was added to each flask (Allen's liquid medium is a standard test composition comprising 50 mg. $NH_4Cl$, 1000 mg. $NaNO_3$, 250 mg. $K_2HPO_4$, 3 mg. $FeCl_3$, 513 mg. $MgSO_4$, 50 mg. $CaCl_2$, and 1000 mil. distilled water).

3. The inoculated flasks, plus untreated inoculated control flasks, were incubated at room temperature (about 25°C) under continuous artificial illumination.

4. Following 5 to 7 days incubation, observation was made for microscopic growth to determine the minimum inhibitory level for each test material.

The results were as follows:

Table 4

| Sample | Minimum effective concentration |
|---|---|
| "Product A" | 1.0 |
| "Product B" | 1.5 |

Antifungal Tests

Using the standard "Tube Dilution Test", the following results were obtained for fungi, i.e. Penicilium expansum (P.E.):

| Sample | Minimum effective concentration |
|---|---|
| "Product A" | 100 |
| "Product B" | 100 |

Although both products were equally effective against fungi, Product A has undiminished effectiveness in the presence of non-ionic emulsifiers and is non-foaming.

In order to determine the non-foaming properties of the present invention as compared with other highly potent commercial quaternary ammonium compounds, a comparative test was made, using the "Waring Blender Foam Test" between Product A, "BTC 776" (Onyx Chemical Co.), an alkyl dimethyl benzyl ammonium chloride, and "BTC 2125" (Onyx Chemical Co.), a mixture of alkyl dimethyl benzyl ammonium compounds and alkyl dimethyl ethylbenzyl ammonium compounds. The procedure was as follows:

A graduated blender cylinder is rinsed with distilled water. 100 ml. of aqueous test solution is added down the walls of the blender so as to cause no foam. The blender is turned to high speed for exactly 5 seconds, and upon turning the blades off, timing is started with a stop watch, and at the same time the foam height read in mm. from the 100 ml. mark. The foam half-life is defined as the time it takes for liquid to drain out of the foam and reach the 50 ml. mark.

The results were as follows:

Table 5

| Sample | ppm. | Foam Height in mm. | Half-life |
|---|---|---|---|
| "BTC 776" | 50 | 15 mm. | 7.2 sec. |
| "Product A" | 50 | 0 | 0 |
| "BTC 2125" | 50 | 15 mm. | 11.4 sec. |

A further test was made using the "Cylinder Shake Test" procedure which is as follows:

Cylinder Shake Test 100 ml. of test solution if gently poured down the walls of a 250 ml. graduated cylinder that has a glass stopper. The cylinder is stoppered and inverted 20 times in 15 seconds, finally resting it in an upright position. The foam height is read in cc. from the base of the foam.

Table 6

| Sample | ppm. | Initial | Foam Height in cc. 1 min. | 5 min. |
|---|---|---|---|---|
| "BTC 776" | 50 | 45 | 34 | 30 |
| "Product A" | 50 | 0 | 0 | 0 |
| "BTC 2125" | 50 | 50 | 6 | 4 |

Another test used was the standard "Ross-Miles Test" using the procedure reported in "ASTM Standards, Designation 1175-53, Part X, 1958, page 878", which is the ASTM test for foaming properties of surface active material. The results were as follows:

Table 7

| Sample | ppm. | Initial | Foam Height in cc. 1 min. | 5 min. |
|---|---|---|---|---|
| "BTC 776" | 50 | 35 | 30 | 20 |
| "Product A" | 50 | 0 | 0 | 0 |
| "BTC 2125" | 50 | 35 | 15 | 10 |

The above results clearly show not only that the product of this invention is highly biocidal but that it is non-foaming, whereas other quaternary ammonium biocides cause a relatively large amount of foaming in aqueous composition.

The following examples illustrate various cosmetic compositions using the product of the present invention:

EXAMPLE 18

| Components | % by Wt. | % by Wt. | % by Wt. | % by Wt. |
|---|---|---|---|---|
| Mineral Oil (65/75 Visc.) | 35.0 | 35.0 | 35.0 | 35.0 |
| Lanolin (Cosmetic Grade) | 1.0 | 1.0 | 1.0 | 1.0 |
| Cetyl alcohol | 1.0 | 1.0 | 1.0 | 1.0 |
| "Tween 80" ("Atlas Powder Co.) (non-ionic emulsifier) | 5.4 | 5.4 | 5.4 | 5.4 |
| "Span 80" (Atlas Powder Co.) (non-ionic emulsifier) | 2.6 | 2.6 | 2.6 | 2.6 |
| "Product A" | 0 | 0.1 | 0.2 | 0.4 |
| Water (Distilled) | 55.0 | 54.9 | 54.8 | 54.6 |

The compositions were each prepared in the following manner:

In the case of the first formulation, without Product A, the mineral oil, lanolin, cetyl alcohol, Tween 80, and "Span 80" were combined and heated to about 65°–70°C. The water was heated to about 65°–70°C and added slowly to the hot non-aqueous phase while stirring the mixture until it emulsified completely. The emulsion was cooled to room temperature using continued agitation.

In each formulation when Product A was incorporated, the mineral oil, lanolin, cetyl alcohol, Tween 80, and Span 80 were combined and heated to about 65°–70°C. The water and Product A were combined and heated to about 65°–70°C. Then the hot aqueous solution was added slowly to the hot non-aqueous phase while stirring, and agitation was maintained until emulsification was effected. Then the emulsion was cooled with continued stirring to room temperature. The resultant product was an oil-in-water emulsion.

These compositions are utilizable as hand creams and baby lotions.

These compositions were tested in the following manner:

50 gm. samples from each composition were aseptically transferred to sterile 8 oz. wide mouth jars. Two replicate jars were prepared in every instance, including an untreated control. Each jar was inoculated with 2.5 ml. of a 1/10 sterile nutrient heated dilution of pooled 24 hour broth cultures of *Staphylococcus aureus. Pseudomonas aeruginosa, Escherichia coli, Enterobacteraerogenes*, Proteus species and Bacillus species. In this manner a bacterial challenge load of $1-10\times10^6$ bacteria/ml. of jar content was obtained. All the inoculated jars were stored at 25°–27°C. At weekly intervals following inoculation, 1 ml. aliquots of jar content were removed from each jar and tenfold serial dilutions were prepared therefrom in sterile Azalectin/Tween 80 neutralizer solution which were plated into TGE ajar. In this manner the number of surviving viable bacteria in each jar was determined. In those instances where no viable surviving bacteria (10 bacteria) were observed at 4 weeks following inoculation, the jar contents were reinoculated exactly as previously described for the inoculation procedure. Storage of all jars was continued at 25°–27°C, and weekly platings were prepared therefrom to enumerate the surviving viable bacteria. A total of eight weekly plating observations were prepared following the inoculation of each jar.

From a statistical point of view, there is no significant difference between an initial inoculum load of $1\times10^6$ and $10\times10^6$ bacteria/ml. The variation around the mean of the inoculum concentration is of little importance when a reduction to less than 10/ml. of viable bacteria is observed.

Table 8

| Week | Count | Count | Count | Count |
|---|---|---|---|---|
| 1 | $69 \times 10^6$ | 15,000 | <10 | <10 |
| 2 | $71 \times 10^6$ | 74,000 | <10 | <10 |
| 3 | $54 \times 10^6$ | 1,400 | <10 | <10 |
| 4 | $81 \times 10^6$ | 10 | <10 | <10 |

In order to double-check the validity of this test showing less than 10 organisms/ml. after 4 weeks, the samples were reinoculated and the weekly counts after reinoculation were:

| Week | Count | Count | Count | Count |
|---|---|---|---|---|
| 5 | $108 \times 10^6$ | <10 | <10 | <10 |
| 6 | $169 \times 10^6$ | <10 | <10 | <10 |
| 7 | $180 \times 10^6$ | <10 | <10 | <10 |
| 8 | $209 \times 10^6$ | <10 | <10 | <10 |

The following examples were prepared in the same manner as Example 18, but substituting other well-known, highly active biocidal quaternary ammonium compounds for Product A. They were then similarly evaluated.

EXAMPLE 19

| Components | % by Wt. | % by Wt. | % by Wt. | % by Wt. |
|---|---|---|---|---|
| Mineral oil (65/75 Visc.) | 35.0 | 35.0 | 35.0 | 35.0 |
| Lanolin (Cosmetic Grade) | 1.0 | 1.0 | 1.0 | 1.0 |

-continued

| Components | % by Wt. | % by Wt. | % by Wt. | % by Wt. |
|---|---|---|---|---|
| Cetyl Alcohol | 1.0 | 1.0 | 1.0 | 1.0 |
| "TWEEN 80" | 5.4 | 5.4 | 5.4 | 5.4 |
| "SPAN 80" | 2.6 | 2.6 | 2.6 | 2.6 |
| "BTC 812 (50%) (Onyx Chem. Co.) | 0 | 0.1 | 0.2 | 0.4 |
| Water (Distilled) | 55.0 | 54.9 | 54.8 | 54.6 |

Table 9

INOCULATION - at $4.7 \times 10^6$ organisms/ml. of jar content for each of the four formulations of Example 19.

| Week | Count | Count | Count | Count |
|---|---|---|---|---|
| 1 | $16 \times 10^6$ | $16 \times 10^6$ | $10 \times 10^6$ | $4 \times 10^6$ |
| 2 | $98 \times 10^6$ | $12 \times 10^6$ | $11 \times 10^6$ | $5 \times 10^6$ |
| 3 | $67 \times 10^6$ | $40 \times 10^6$ | $24 \times 10^6$ | $10 \times 10^6$ |
| 4 | $142 \times 10^6$ | $102 \times 10^6$ | $84 \times 10^6$ | $61 \times 10^6$ |
| 5 | $167 \times 10^6$ | $119 \times 10^6$ | $84 \times 10^6$ | $67 \times 10^6$ |
| 6 | $180 \times 10^6$ | $144 \times 10^6$ | $32 \times 10^6$ | $44 \times 10^6$ |
| 7 | $140 \times 10^6$ | $95 \times 10^6$ | $82 \times 10^6$ | $76 \times 10^6$ |
| 8 | $94 \times 10^6$ | $82 \times 10^6$ | $68 \times 10^6$ | $54 \times 10^6$ |

EXAMPLE 20

| Components | % by Wt. | % by Wt. | % by Wt. | % by Wt. |
|---|---|---|---|---|
| Mineral Oil (65/75 Visc.) | 35.0 | 35.0 | 35.0 | 35.0 |
| Lanolin (Cosmetic Grade) | 1.0 | 1.0 | 1.0 | 1.0 |
| Cetyl Alcohol | 1.0 | 1.0 | 1.0 | 1.0 |
| "TWEEN 80" | 5.4 | 5.4 | 5.4 | 5.4 |
| "SPAN 80" | 2.6 | 2.6 | 2.6 | 2.6 |
| "BTC 2125M" (50%) (Onyx Chem. Co.) | 0 | 0.1 | 0.2 | 0.4 |
| Water (Distilled) | 55.0 | 54.9 | 54.8 | 54.6 |

Table 10

INOCULATION - at $3.8 \times 10^6$ organisms/ml. of jar content for each of the four formulations of Example 20:

| Week | Count | Count | Count | Count |
|---|---|---|---|---|
| 1 | $18 \times 10^6$ | $18 \times 10^6$ | $15 \times 10^6$ | $8.8 \times 10^6$ |
| 2 | $23 \times 10^6$ | $21 \times 10^6$ | $12 \times 10^6$ | $6.2 \times 10^6$ |
| 3 | $87 \times 10^6$ | $74 \times 10^6$ | $84 \times 10^6$ | $56 \times 10^6$ |
| 4 | $106 \times 10^6$ | $56 \times 10^6$ | $70 \times 10^6$ | $80 \times 10^6$ |
| 5 | $109 \times 10^6$ | $84 \times 10^6$ | $56 \times 10^6$ | $26 \times 10^6$ |
| 6 | $92 \times 10^6$ | $79 \times 10^6$ | $45 \times 10^6$ | $36 \times 10^6$ |
| 7 | $114 \times 10^6$ | $89 \times 10^6$ | $67 \times 10^6$ | $50 \times 10^6$ |
| 8 | $121 \times 10^6$ | $102 \times 10^6$ | $81 \times 10^6$ | $62 \times 10^6$ |

EXAMPLE 21

| Components | % by Wt. | % by Wt. | % by Wt. | % by Wt. |
|---|---|---|---|---|
| Mineral Oil (65/75 Visc.) | 35.0 | 35.0 | 35.0 | 35.0 |
| Lanolin (Cosmetic Grade) | 1.0 | 1.0 | 1.0 | 1.0 |
| Cetyl Alcohol | 1.0 | 1.0 | 1.0 | 1.0 |
| "TWEEN 80" | 5.4 | 5.4 | 5.4 | 5.4 |
| "SPAN 80" | 2.6 | 2.6 | 2.6 | 2.6 |
| "HYAMINE 1622" (50%) (Rohm & Haas) | 0 | 0.1 | 0.2 | 0.4 |
| Water (Distilled) | 55.0 | 54.9 | 54.8 | 54.6 |

Table 11

INOCULATION - at $3.8 \times 10^6$ organisms/ml. of jar content for each of the four formulations of Example 21:

| Week | Count | Count | Count | Count |
|---|---|---|---|---|
| 1 | $22 \times 10^6$ | $19 \times 10^6$ | $17 \times 10^6$ | $15 \times 10^6$ |
| 2 | $24 \times 10^6$ | $21 \times 10^6$ | $19 \times 10^6$ | $14 \times 10^6$ |
| 3 | $86 \times 10^6$ | $71 \times 10^6$ | $94 \times 10^6$ | $81 \times 10^6$ |
| 4 | $94 \times 10^6$ | $80 \times 10^6$ | $72 \times 10^6$ | $92 \times 10^6$ |
| 5 | $106 \times 10^6$ | $74 \times 10^6$ | $67 \times 10^6$ | $56 \times 10^6$ |
| 6 | $116 \times 10^6$ | $91 \times 10^6$ | $84 \times 10^6$ | $70 \times 10^6$ |
| 7 | $92 \times 10^6$ | $74 \times 10^6$ | $42 \times 10^6$ | $28 \times 10^6$ |
| 8 | $94 \times 10^6$ | $82 \times 10^6$ | $56 \times 10^6$ | $43 \times 10^6$ |

EXAMPLE 22

| Components | % by Wt. | % by Wt. | % by Wt. | % by Wt. |
|---|---|---|---|---|
| Mineral Oil (65/75 Visc.) | 35.0 | 35.0 | 35.0 | 35.0 |
| Lanolin (Cosmetic Grade) | 1.0 | 1.0 | 1.0 | 1.0 |
| Cetyl Alcohol | 1.0 | 1.0 | 1.0 | 1.0 |
| "TWEEN 80" | 5.4 | 5.4 | 5.4 | 5.4 |
| "SPAN 80" | 2.6 | 2.6 | 2.6 | 2.6 |
| "HYAMINE 2389" (50%) (Rohm & Haas) | 0 | 0.1 | 0.2 | 0.4 |
| Water (Distilled) | 55.0 | 54.9 | 54.8 | 54.6 |

Table 12

INOCULATION - at $4.8 \times 10^6$ organisms/ml. of jar content for each of the four formulations of Example 22.

| Week | Count | Count | Count | Count |
|---|---|---|---|---|
| 1 | $20 \times 10^6$ | $16 \times 10^6$ | $16 \times 10^6$ | $12 \times 10^6$ |
| 2 | $89 \times 10^6$ | $17 \times 10^6$ | $14 \times 10^6$ | $15 \times 10^6$ |
| 3 | $104 \times 10^6$ | $34 \times 10^6$ | $44 \times 10^6$ | $16 \times 10^6$ |
| 4 | $92 \times 10^6$ | $50 \times 10^6$ | $2 \times 10^6$ | $40 \times 10^6$ |
| 5 | $79 \times 10^6$ | $60 \times 10^6$ | $45 \times 10^6$ | $29 \times 10^6$ |
| 6 | $104 \times 10^6$ | $92 \times 10^6$ | $60 \times 10^6$ | $22 \times 10^6$ |
| 7 | $89 \times 10^6$ | $67 \times 10^6$ | $32 \times 10^6$ | $15 \times 10^6$ |
| 8 | $76 \times 10^6$ | $40 \times 10^6$ | $28 \times 10^6$ | $20 \times 10^6$ |

Although oil-in-water emulsions have been described above, it is within the scope of the present invention to use water-in-oil emulsions for the same purposes.

The invention claimed is:

1. A method of controlling the proliferation of fungi in an aqueous system, which comprises applying to said fungi a fungicidally effective amount of a condensation product formed by mixing 1,4-bis-dimethylamino-2-butene dissolved in a solvent with 1,4-dihalo-2-butene at room temperature whereby an exothermic reaction is obtained causing the temperature of the mixture to rise, then maintaining the mixture at no higher than reflux temperature until the reaction is complete, wherein these reactants are present in a molar proportion of between about 1:3 and about 3:1 relative to each other.

2. The method of claim 1 wherein the dihalo is dichloro.

3. The method of claim 1 wherein the dihalo is dibromo.

4. The method of claim 1 wherein the aqueous system is recirculated water.

5. The method of claim 1 wherein the aqueous system is an aqueous emulsion containing non-ionic emulsifiers.

* * * * *